US009536438B2

(12) United States Patent
Sanders et al.

(10) Patent No.: US 9,536,438 B2
(45) Date of Patent: Jan. 3, 2017

(54) SYSTEM AND METHOD FOR CUSTOMIZING READING MATERIALS BASED ON READING ABILITY

(75) Inventors: Aaron Dale Sanders, Rochester, NY (US); Erika Marie Sanders, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 274 days.

(21) Appl. No.: 13/475,220

(22) Filed: May 18, 2012

(65) Prior Publication Data
US 2013/0309640 A1 Nov. 21, 2013

(51) Int. Cl.
G09B 5/08 (2006.01)
(52) U.S. Cl.
CPC ....................... G09B 5/08 (2013.01)
(58) Field of Classification Search
CPC .......... G09B 17/00; G09B 19/06; G09B 17/04
USPC ........................................................ 434/178
See application file for complete search history.

(56) References Cited

U.S. PATENT DOCUMENTS

| | | | |
|---|---|---|---|
| 3,680,229 A | 8/1972 | Serrie et al. | |
| 5,957,693 A * | 9/1999 | Panec ........................... | 434/178 |
| 6,683,611 B1 * | 1/2004 | Cleveland ..................... | 345/471 |
| 6,733,295 B2 * | 5/2004 | Stuppy et al. ................ | 434/322 |
| 6,869,287 B1 * | 3/2005 | Tadlock et al. ............... | 434/178 |
| 6,953,343 B2 | 10/2005 | Townshend | |
| 7,254,527 B2 * | 8/2007 | Xun .................................. | 704/4 |
| 7,313,513 B2 | 12/2007 | Kinder | |
| 7,455,522 B2 | 11/2008 | Polanyi et al. | |
| 7,456,834 B2 | 11/2008 | Cleveland | |
| 7,905,391 B1 | 3/2011 | Shilling | |
| 2003/0068603 A1 * | 4/2003 | Cupp ............................ | 434/178 |
| 2004/0152054 A1 * | 8/2004 | Gleissner et al. ............. | 434/156 |
| 2006/0010378 A1 | 1/2006 | Mori | |
| 2006/0282413 A1 | 12/2006 | Bondi | |
| 2007/0172810 A1 | 7/2007 | McCallum et al. | |
| 2007/0292826 A1 | 12/2007 | Goddy et al. | |
| 2008/0059145 A1 * | 3/2008 | Wood et al. ..................... | 704/2 |
| 2008/0070205 A1 | 3/2008 | Amick et al. | |
| 2008/0281579 A1 * | 11/2008 | Tsukiji et al. ..................... | 704/3 |
| 2008/0311547 A1 | 12/2008 | Samuels | |
| 2009/0197225 A1 | 8/2009 | Sheehan et al. | |
| 2009/0311657 A1 * | 12/2009 | Dodelson et al. ............. | 434/350 |
| 2010/0105016 A1 * | 4/2010 | Margolis ........................ | 434/178 |

(Continued)

Primary Examiner — Sam Yao
Assistant Examiner — Michael Humphrey
(74) Attorney, Agent, or Firm — MH2 Technology Law Group LLP

(57) ABSTRACT

A reading device, such as a mobile tablet, may download an electronic reading material, such as a textbook, to local memory. The reading device may store a reader profile representing one or more aspects of a user's reading ability. The reading device may convert the downloaded reading material using the reader profile to better conform to the user's reading ability. As the user reads reading materials using the reading device, the user may provide feedback as to portions of text in the reading materials, including whether a word is not recognized, whether a grammatical construction is confusing, etc. Using the received feedback, the reading device may modify the reading profile to further improve the degree to which it represents the user's reading ability. Once modified, the reader profile may be used to re-convert already downloaded reading materials or to convert subsequently downloaded reading materials.

16 Claims, 4 Drawing Sheets

(56) References Cited

U.S. PATENT DOCUMENTS

2010/0311021 A1* 12/2010 Abello .................... 434/169
2012/0054672 A1*  3/2012 McDowell ............... 715/784
2013/0295535 A1* 11/2013 Levy et al. .............. 434/169

* cited by examiner

SYSTEM AND METHOD FOR CUSTOMIZING READING MATERIALS BASED ON READING ABILITY

TECHNICAL FIELD

The present disclosure relates generally to methods, systems, and computer-readable media for downloading, modifying, and reading electronic reading materials using a consumer reading device.

BACKGROUND

Different persons may have different reading abilities due to various factors such as age, education, native language, vocabulary, and/or general intelligence. Typically, reading materials are published in only a single version, which may correspond to a particular reading level. As a result, a publication corresponding to an intermediate reading level may be overly challenging for a reader having only an elementary reading ability, yet may be overly simplistic for a reader having an advanced reading ability.

The problem of disparate reading abilities may present problems in education settings, where a group of students having different reading abilities may be required, by school or state curriculum, to read the same textbook. And the problem may be particularly acute in special education classrooms, where reading abilities may vary even more significantly between students.

Accordingly, there is a need for enabling different persons having different reading abilities to read the same reading materials at their respective reading levels.

SUMMARY

A reading device, such as a mobile tablet, may download an electronic reading material, such as a textbook, to local memory. The reading device may store a reader profile representing one or more aspects of a user's reading ability. The reading device may convert the downloaded reading material using the reader profile to better conform to the user's reading ability. As the user reads reading materials using the reading device, the user may provide feedback as to portions of text in the reading materials, including whether a word is not recognized, whether a grammatical construction is confusing, etc. Using the received feedback, the reading device may modify the reading profile to further improve the degree to which it represents the user's reading ability. Once modified, the reader profile may be used to re-convert already downloaded reading materials or to convert subsequently downloaded reading materials.

Additional objects, advantages, and embodiments of the present disclosure will be set forth in part in the description that follows, and in part will be derived from the description, or may be learned by practice of the disclosed embodiments. The objects, advantages, and embodiments of the present disclosure will be realized and attained by means of the elements and combinations particularly pointed out in the appended claims. It is to be understood that both the foregoing general description and the following detailed description are exemplary and explanatory only and are not restrictive of the present disclosure, as claimed. It is also to be understood that use of the word "exemplary" throughout the application is to be understood as providing examples that may be useful for illustrating general principles or concepts; thus, figures and descriptions identified as "exemplary" should not be interpreted as representing the best or only approaches to practicing the disclosed embodiments.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
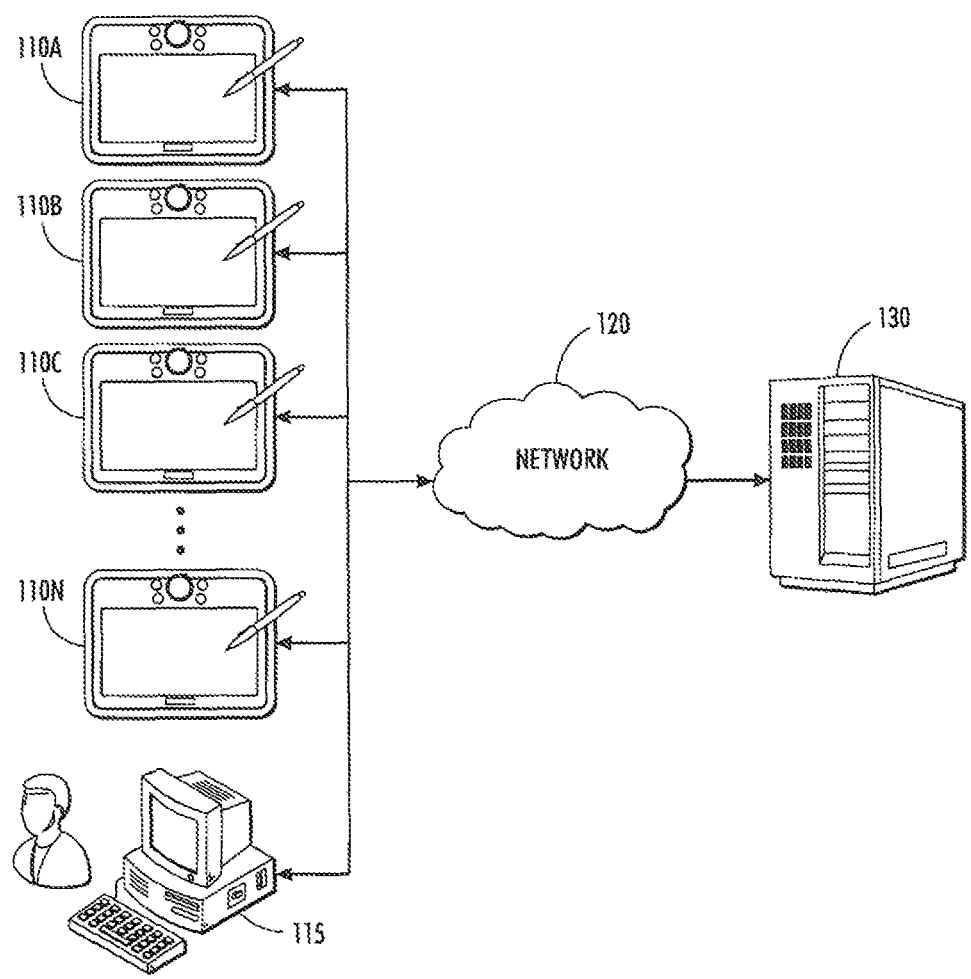
FIG. 1 is a diagram depicting an exemplary network configuration in which various embodiments of the present disclosure may be practiced.

The following detailed description refers to the accompanying drawings. Wherever convenient, the same reference numbers are used in the drawings and the following description to refer to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

FIG. 1 is a diagram depicting an exemplary network configuration in which various embodiments of the present disclosure may be practiced. In some embodiments, each student in a classroom setting may be given a reading device 110, such as a tablet. A classroom instructor, or other education coordinator, may use a conventional computing device 115, such as a desktop or laptop computer, to configure reading devices 110A-110N and to communicate with a publisher server 130. Publisher server 130 may be a conventional web server, or other type of computing device, capable of delivering electronic reading data, such as electronic textbooks, to one or more reading devices 110A-110N and/or computing device 115.

In some embodiments, an instructor may use computing device 115 to communicate with publisher server 130 via a network 120, such as the Internet. The instructor may log into an instructor or school account hosted by publisher server 130 to create individual student accounts and to register associated reading devices 110A-110N for those student accounts. Once registered, individual students may use reading devices 110A-110N to download electronic reading material, such as electronic textbooks, from publisher server 130 via network 120.

Figure 2:
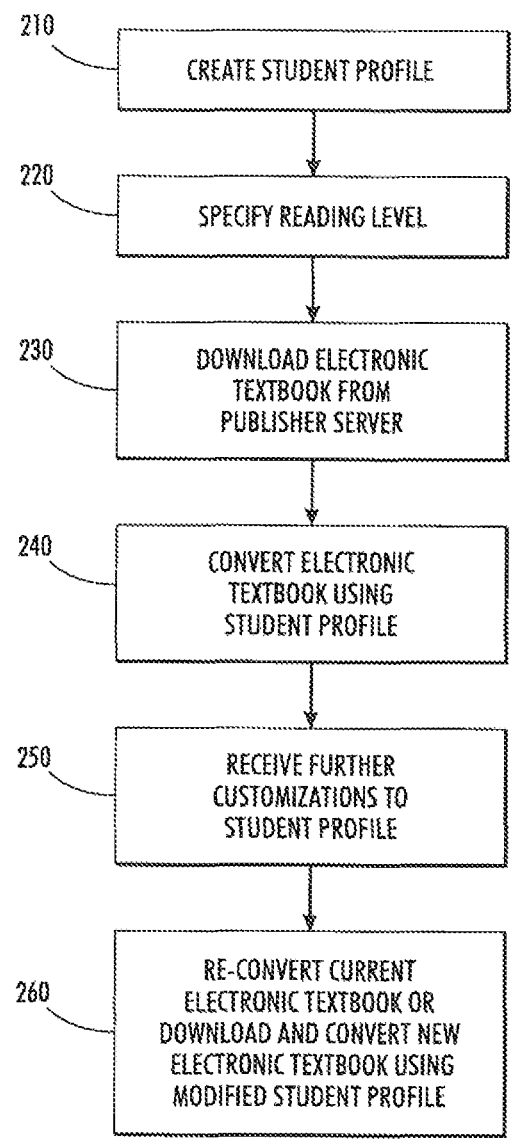
FIG. 2 is a diagram depicting an exemplary flowchart for downloading and converting an electronic textbook using a student profile, consistent with certain disclosed embodiments.

FIG. 2 is a diagram depicting an exemplary flow chart for downloading and converting an electronic textbook using a student profile, consistent with certain disclosed embodiments. In some embodiments, in addition to creating student accounts on publisher server 130, each reading device 110 may be configured to store a student profile associated with the student who uses the reading device to read electronic material. Thus, in step 210, a student profile may be created on the reading device assigned to the student. The student profile may be created using either the reading device 110 itself or the instructor's computing device 115. In some embodiments, the instructor may initially create the student profile on publisher server 130, and publisher server 130 may copy or communicate that student profile to an individual reading device 110.

In some embodiments, a student profile may include information representing various aspects of the student's reading ability. Reading ability may refer to the student's ability to simply read text, either out loud or silently, and/or the student's ability to comprehend text that is read. Aspects of reading ability may include, without limitation, word length; number of syllables per word or group of words; sentence length; grammatical structures; phrasing structures; punctuation; vocabulary; recognized idioms, expressions, or figures of speech; concepts; and use of foreign language terms or expressions. For ease of discussion, reference will be made throughout this disclosure to "values" of any of these aspects. As used herein, the term "value" may be understood to represent a set of permissible words, structures, symbols, lengths, etc. for a given aspect.

For example, a first value of a vocabulary aspect of a student's reading ability may represent a set of words that the student may be expected to be able to read or understand. Thus, changing the vocabulary aspect of the student's reading ability from a first value to a second value may entail adding additional words to the set that the student may be expected to be able to read or understand and/or removing certain words from the set.

Similarly, a grammatical structures aspect of a student's reading ability may represent a set of grammatical structures, such as the number of independent/dependent clauses per sentence, verb tenses, etc., that the student may be expected to be able to understand. And, a word length or sentence length aspect may represent a maximum word length or sentence length, with possible exceptions, that the student would be expected to be able to read without significant difficulty. Those skilled in the art will appreciate how other reading ability aspects may be represented by values such as sets, lengths, or ranges.

In some cases, a reading level may be defined, which may represent a particular set of values for one or more reading ability aspects. For example, an educational institution or a state may establish a fourth grade reading level, which may specify a certain vocabulary value, a certain maximum sentence length, a certain punctuation value, etc. That entity may further define fifth grade through twelfth grade reading levels, with each subsequent reading level modifying the value of a reading ability attribute in a way that would be viewed as increasing in difficulty. For example, using the Fry methodology, the reading grade level of content may be determined based on the average number of sentences per 100 words and the average number of syllables per 100 words.

However, as used herein, a first reading level need not relate to a second reading level in terms of being simply more or less difficult. Rather, in the present disclosure, a reading level may simply refer to any set of values for reading ability aspects. Thus, a first reading level may be more challenging than a second reading level in one aspect, yet less challenging in another aspect. Moreover, the term reading level need not refer to a grade level or be set by an educational or governmental authority.

Thus, in step 220, one technique for creating a student profile on a reading device 110 may be to simply specify an initial reading level for the student. For example, a new student may be added to a third-grade class before the student's reading ability has been determined. Therefore, as a starting point, the student's profile may be initially set at a defined third grade reading level. Alternatively, an initial reading level that is appropriate for the student may be determined by having the student take one or more standardized tests, such as the Developmental Reading Assessment® test or the QR5 test, using either the reading device 110 or another device.

In step 230, a reading device 110 may download an electronic textbook (or other electronic reading material) from publisher server 130. For example, one component of a particular class's curriculum may be for the students to read a version of a particular novel. Thus, each student may use his or her reading device 110 to download an electronic version of the novel from publisher server 130.

In some embodiments, although each student may have different reading abilities, each student may nonetheless download the same version of the electronic textbook. However, in order to ensure that each student uses a textbook that is appropriate for his or her reading ability, each student may use his or her reading device 110 to customize the downloaded electronic textbook using a student profile. Thus, in step 240, a reading device 110 may convert a downloaded electronic textbook using the student profile stored on the reading device.

For example, using grammatical and syntax rules, reading device 110 may convert a single sentence into multiple sentences if the sentence has a length longer than the maximum sentence length value of the student profile. As another example, for words appearing in the electronic textbook that are not in the student profile's vocabulary set or that exceed a maximum word length, the reading device may replace the words with synonyms that are in the student profile's vocabulary set or that do not exceed the maximum word length. Reading device 110 may perform similar operations for modifying or replacing grammatical structures, phrasing structure, punctuation, idioms, expressions, figures of speech, concepts, foreign language terms, etc.

In some embodiments, the downloaded electronic textbook may include an indication of its reading level or other metadata about its readability aspects, and conversion operations may be performed based thereon. In other embodiments, a downloaded electronic textbook may not include such information, and therefore the reading device 110 may analyze the electronic textbook to determine such information. For example, using the Fry methodology to determine reading grade level, reading device 110 may randomly select three 100-word passages from the electronic textbook. Reading device 110 may determine the average number of syllables per word and the average number of sentences in the three 100-word passages and may determine the closest matching reading grade level based thereon.

Once the conversion process has been performed, the student may read the converted textbook using his or her reading device 110.

In some embodiments, a reading device 110 may be configured to allow further customization of a student's profile beyond a standard reading level setting. For example, as described above, it may be that a student has not been tested for reading ability prior to creation of the student profile, and thus the student profile may simply be set at an initial reading level. However, in some cases, the initial reading level may be too easy or too advanced for the student. In some cases, the initial reading level may be too easy for the student for some aspects of the student's reading ability yet too advanced for other aspects. Or, the initial reading level may be too easy for some academic subjects, such as science, yet too advanced for other academic subjects, such as English. Therefore, the present disclosure provides for additional customization of the student profile in these and other ways. In some embodiments, such customizations may be performed while the student is reading materials on the reading device.

Figure 3:
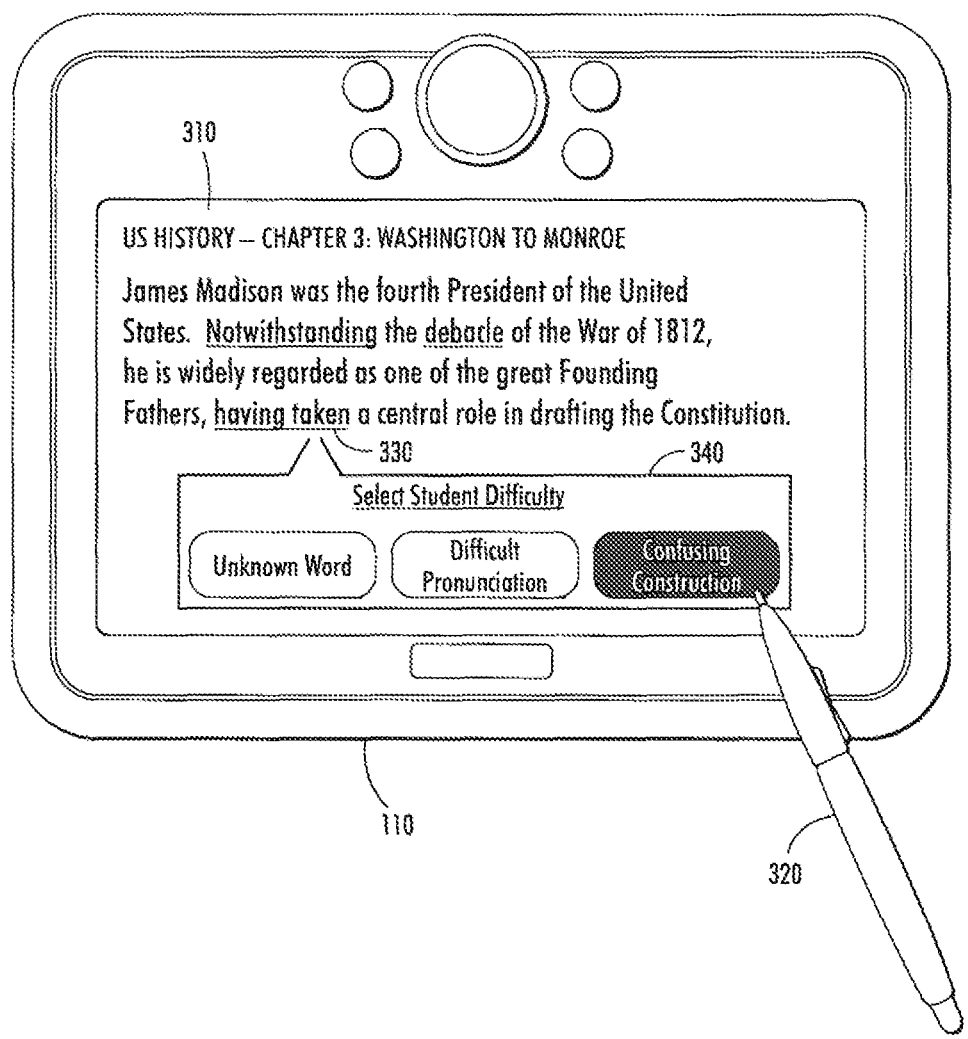
FIG. 3 is a diagram depicting an exemplary reading device interface that may be used to customize a student profile, consistent with certain disclosed embodiments.

For example, as depicted in FIG. 3, a student may use a reading device 110 to read an electronic textbook 310. In this example, electronic textbook 310 may have been converted using the student's profile prior to display on reading device 110, or the electronic textbook may be displayed in its original downloaded form. As the student reads the electronic textbook 310, the student may select portions of the text—e.g., words, phrases, punctuation, etc.—using a stylus 320 or other means.

In some embodiments, if a student'selects a textual portion 330, a dialogue box 340 or other user interface tool may appear to prompt the user for information about why the student selected the component. For example, as depicted in FIG. 3, in response to selection of the words "having taken," dialogue box 340 prompts the user to indicate whether the student did not recognize a word, was unable to pronounce one or more of the words, or was confused by the grammatical or stylistic construction. Those skilled in the art will appreciate, that the options depicted in dialogue box 340 are exemplary only, and that many other diverse options may be displayed for providing student feedback with respect to a selected textual portion.

As the student reads, the student or another user may continually provide feedback as to displayed reading materials using techniques such as those described above. Using each additional piece of feedback, reading device 110 may continually and incrementally customize the student's profile to better match the student's reading ability. Moreover, as mentioned above, in some cases, a student's reading ability may vary across subjects. Therefore, reading device 110 may customize the student's profile differently for different subjects in response to receiving feedback.

In some embodiments, if reading device 110 receives feedback for an electronic textbook, it may use that information to customize the student's profile only for the academic subject of the textbook. In other embodiments, feedback received for one academic subject may result in the student's profile being customized mostly for the academic subject of the textbook, but to a lesser degree for other academic subjects.

In still other embodiments, reading device 110 may determine whether or how to apply feedback within a first academic subject to a second academic subject by evaluating feedback received within the second academic subject. For example, during the course of reading a first electronic textbook within a first academic subject, such as English, reading device 110 may receive feedback that the student has trouble with certain reading aspects. However, during the course of reading a second electronic textbook within a second academic subject, such as Geography, reading device 110 may receive no feedback that the student has difficulty with the same reading aspects. Thus, reading device 110 may not customize the student profile with respect to the second academic subject using the feedback received within the first academic subject, or may customize the student profile to a lesser degree in the second academic subject.

Furthermore, customizations may be made using techniques other than feedback during the course of reading electronic materials. In some embodiments, reading device 110 may provide a student profile interface that allows the student or another user to adjust reading ability factors such as sentence length, vocabulary, etc. on either a universal or a subject-by-subject basis. In still other embodiments, an instructor may customize the student profile using a separate device, such as a desktop computing device 115.

Using any of the above described or other techniques, reading device 110 may receive further customizations to a student profile (step 250). Thereafter, the modified student profile may be used to either re-convert a previously downloaded electronic textbook or to convert a newly downloaded electronic textbook (step 260). As a result, reading materials converted using the updated student profile should better conform to the student's reading ability.

In addition to receiving and storing feedback concerning selected portions of text, reading device 110 may also include functionality for aiding a student in understanding selected portions. For example, in response to an indication that a student does not recognize a selected word, reading device 110 may display a definition of the word, a hyperlink to a definition of the word, a synonym, a use of the word in a different sentence, or a picture representing the meaning of the word. Similarly, in response to an indication that a student is unable to pronounce a selected word, reading device 110 may provide audible and/or visual assistance, such as playing a recording of a pronunciation of the word or displaying a phonetic spelling of the word.

Although the operations described with respect to FIG. 2 have been described as being performed by a reading device 110, those skilled in the art will appreciate that one or more such operations may be performed by different devices. For example, in some embodiments, student profiles may be created, stored, or customized on publisher server 130. In addition, publisher server 130 may automatically convert an electronic reading material according to a registered student profile before sending the reading material to a reading device 110 associated with the student profile. However, in some cases, it may be preferable to maintain student profiles on reading devices 110 so that electronic materials may be downloaded and converted from multiple different publishers without the need to create and maintain separate user profiles on separate publisher servers 130.

In other embodiments, student profiles may be stored or maintained, or electronic reading materials may be converted, by a device other than reading device 110, such as an instructor device 115. In the event that student profiles are not maintained on individual reading devices 110, students may access their customized reading materials using any reading device 110 that is capable of logging into a hosting device such as instructor device 115 or publisher server 130.

Moreover, whether student profiles are stored on reading devices 110 or other hosting devices, a reading device 110 may store or access multiple different student profiles. For example, a classroom may have a limited set of reading devices 110. If the classroom is structured such that different students use the reading devices 110 during different class periods, then a reading device 110 may store multiple student profiles, one for each student that uses the reading device. Reading devices 110 may be equipped with login or authentication mechanisms to enable students to access only their profiles and electronic reading materials. In some embodiments, customizations or revisions to a student's profile may also be communicated to a system that tracks and monitors the student's academic progress, such as AIMSweb®.

Figure 4:
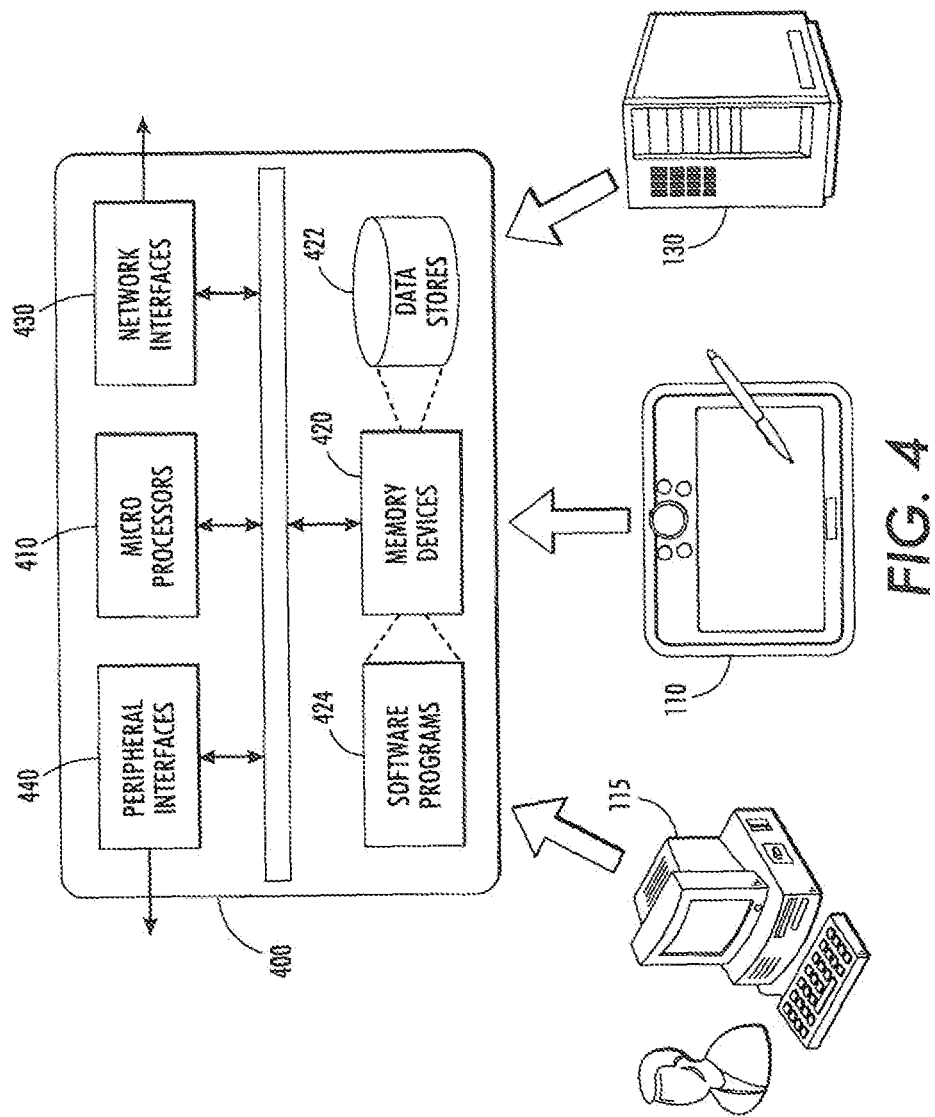
FIG. 4 is a diagram depicting an exemplary hardware configuration that may be used to implement one or more of the disclosed embodiments.

FIG. 4 is a diagram depicting an exemplary hardware configuration 400 for any one or more of reading device 110, instructor computing device 115, or publisher server 130. Hardware configuration 400 may include one or more microprocessors 410 of varying core configurations and clock frequencies; one or more memory devices or computer-readable media 420 of varying physical dimensions and storage capacities, such as flash drives, hard drives, random access memory, etc., for storing data, such as reading materials, files, images, and/or program instructions for execution by one or more microprocessors 410; one or more network interfaces 430, such as Ethernet adapters, wireless transceivers, or serial network components, for communicating over wired or wireless media using protocols, such as Ethernet, wireless Ethernet™, GSM, WiMAX™, etc.; and one or more peripheral interfaces 440, such as keyboards, mice, touchpads, computer screens, touchscreens, etc., for enabling human interaction with and manipulation of any of reading device 110, instructor computing device 115, or publisher server 130. In some embodiments, the components of hardware configuration 400 need not be enclosed within a single enclosure or even located in close proximity to one another.

Memory devices 420 may further be physically or logically arranged or configured to provide for or store one or more data stores 422, such as one or more file systems or databases, and one or more software programs 424, which may contain interpretable or executable instructions for performing one or more of the disclosed embodiments. Those skilled in the art will appreciate that the above-described componentry is exemplary only, as reading device 110, instructor computing device 115, or publisher server 130 may comprise any type of hardware componentry, including any necessary accompanying firmware or software, for performing the disclosed embodiments. Reading device 110, instructor computing device 115, or publisher server 130 may also be implemented in part or in whole by electronic circuit components or processors, such as application-specific integrated circuits (ASICs) or field-programmable gate arrays (FPGAs).

The foregoing description of the present disclosure, along with its associated embodiments, has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments.

For example, although embodiments have been described primarily in the context of electronic textbooks for educational settings, the present disclosure is not so limited. Rather, the present disclosure may be used in any context for automatically converting electronic reading materials to suit a user's reading ability. For example, in some embodiments, one or more of the above techniques may be employed using a web browser. A user may establish a reader profile using the web browser that includes various attributes of the user's reading ability. When the browser downloads a webpage, the browser may convert the text of the webpage according to the user's profile so that the text better conforms to the user's reading ability.

Likewise, the steps described need not be performed in the same sequence discussed or with the same degree of separation. Various steps may be omitted, repeated, combined, or divided, as necessary to achieve the same or similar objectives or enhancements. Accordingly, the present disclosure is not limited to the above-described embodiments, but instead is defined by the appended claims in light of their full scope of equivalents.

In the above description and in the below claims, unless specified otherwise, the term "execute" and its variants are to be interpreted as pertaining to any operation of program code or instructions on a device, whether compiled, interpreted, or run using other techniques. Also, in the claims, unless specified otherwise, the term "set" is to be interpreted as "one or more."

What is claimed is:

1. An electronic reading system, comprising:
a display screen;
a processing system comprising one or more processors; and
a memory system comprising one or more computer-readable media, wherein the computer-readable media contain instructions stored therein that, if executed by the processing system, cause the electronic reading system to perform operations to:
store in the memory system a reader profile, the reader profile including a plurality of aspects of a user's reading ability, wherein the aspects of the user's reading ability comprise: a maximum word length, a, a set of grammatical structures, a set of phrasing structures, a set of figures of speech, and a set of foreign language terms;
download electronic data representing an original reading material;
convert the original reading material to a first reading material based on the reader profile;
display, using the display screen, a portion of the first reading material comprising a first text;
receive an indication identifying a portion of the first text via a graphical user interface;
display a plurality of options in response to the received indication, wherein the plurality of options relates to a reason for the identification of the portion first text, wherein the plurality of options comprise: a word is unrecognizable to the user, a word is unpronounceable by the user, and the user is confused by the grammatical or stylistic construction, and wherein the plurality of options is displayed, on the display screen, together with the first text;
receive a selection of one of the plurality of options;
update the reader profile, wherein the update modifies at least one of the plurality of aspects of a user's reading ability within the reader profile, wherein the update that corresponding to the received selection representing the reason for identifying the portion of the first text;
identify portions of the first text that require modification to conform to the aspects of the user's reading ability in updated reader profile;
convert the identified portions of the first text to a second text based on the updated reader profile, wherein the second text is a modification of the identified portions of the first text based on the selected reason for identifying the portion of the first reading material, the modification of the first text includes at least one of replacing or altering vocabulary, grammatical structures, phrasing structure, punctuation, idioms, expressions, figures of speech, concepts, and sentences to conform to required aspects of the user's reading ability in updated reader profile; and
replace the identified portions of first text displayed on the display screen with the corresponding second text.

2. The system of claim 1, wherein:
the reader profile indicates a reading grade level of the user.

3. The system of claim 1, wherein the operations further comprise:
presenting a user interface using the display screen, wherein the user interface provides functionality for enabling the user to modify values for the one or more aspects.

4. The system of claim 1, wherein the memory system stores a plurality of different reader profiles.

5. The system of claim 1, wherein the reader profile contains different values for one or more aspects of the user's reading ability for different academic subjects.

6. The system of claim 1, wherein the operations further comprise:
further modifying the reader profile based on a second indication identifying a portion of the first reading material or the selected one of the plurality of options.

7. The system of claim 6, wherein the instructions further comprise:
converting the second text to third text using the further modified reader profile, wherein the third text better conforms to the user's reading ability than the second text; and replace the second text displayed on the display screen with the corresponding third text.

8. The system of claim 6, wherein the instructions further comprise:
downloading data representing a second reading material, wherein the second reading material comprises a third text;
converting the third text to fourth text using the modified reader profile, wherein the fourth text better conforms to the user's reading ability than the third text; and
displaying all or part of the fourth text using the display screen.

9. A computer-implemented method of converting electronic reading materials based on user reading ability, the method comprising:
storing in a memory system a reader profile, a reader profile including a plurality of aspects of a user's reading ability, wherein the aspects of the user's reading ability comprise: a maximum word length, a, a set of grammatical structures, a set of phrasing structures, a set of figures of speech, and a set of foreign language terms;
downloading data representing an original reading material;
converting the original reading material to a first reading material based on the reader profile;
display, using the display screen, a portion of the first reading material comprising a first text;
receiving an indication identifying a portion of the first text via a graphical user interface;
displaying, a plurality of options in response to the received indication, wherein the plurality of options relates to a reason for the identification of the portion of the first text, wherein the plurality of options comprise: a word is unrecognizable to the user, a word is unpronounceable by the user, and the user is confused by the grammatical or stylistic construction, and wherein the plurality of options is displayed, on the display screen, together with the first text;
receiving a selection of one of the plurality of options;
updating the reader profile, wherein the update modifies at least one of the plurality of aspects of a user's reading ability within the reader profile, wherein the update that corresponding to the received selection representing the reason for identifying the portion of the first text;
identifying portions of the first text that require modification to conform to the aspects of the user's reading ability in updated reader profile
converting, using one or more processors, the identified portions of the first text to a second text based on the updated reader profile, wherein the second text is a modification of the identified portions of the first text based on the selected reason for identifying the portion of the first reading material, the modification of the first text include at least one of replacing or altering vocabulary, grammatical structures, phrasing structure, punctuation, idioms, expressions, figures of speech, concepts, and sentences to conform to required aspects of the user's reading ability in updated reader profile; and
replacing the identified portions of first text displayed on the display screen with the corresponding second text.

10. The method of claim 9, wherein:
the reader profile indicates a reading grade level of the user.

11. The method of claim 9, further comprising:
presenting a user interface using the display screen, wherein the user interface provides functionality for enabling the user to modify values for the one or more aspects.

12. The method of claim 9, further comprising:
storing a plurality of different reader profiles in the memory system.

13. The method of claim 9, wherein the reader profile contains different values for one or more aspects of the user's reading ability for different academic subjects.

14. The method of claim 9, further comprising:
further modifying the reader profile based on a second indication identifying a portion of the first reading material or the selected one of the plurality of options.

15. The method of claim 14, further comprising:
converting the second text to third text using the further modified reader profile, wherein the third text better conforms to the user's reading ability than the second text; and replace the second text displayed on the display screen with the corresponding third text.

16. The method of claim 14, further comprising:
downloading data representing a second reading material, wherein the second reading material comprises a third text;
converting the third text to fourth text using the modified reader profile, wherein the fourth text better conforms to the user's reading ability than the third text; and
displaying all or part of the fourth text using the display screen.

* * * * *